(12) United States Patent
Rapparini

(10) Patent No.: US 11,014,757 B2
(45) Date of Patent: May 25, 2021

(54) MACHINE AND METHOD FOR PRESSURE RELIEF VALVES FOR HERMETIC CONTAINERS

(71) Applicant: ICA S.p.A, Bologna (IT)

(72) Inventor: Gino Rapparini, Bologna (IT)

(73) Assignee: ICA S.P.A., Bologna (IT)

( * ) Notice: Subject to any disclaimer, the term of this patent is extended or adjusted under 35 U.S.C. 154(b) by 178 days.

(21) Appl. No.: 16/125,919

(22) Filed: Sep. 10, 2018

(65) Prior Publication Data
US 2019/0092574 A1    Mar. 28, 2019

(30) Foreign Application Priority Data

Sep. 26, 2017 (IT) .................. 102017000107570

(51) Int. Cl.
| | | |
|---|---|---|
| *B65G 27/16* | (2006.01) | |
| *B65B 61/20* | (2006.01) | |
| *B31B 70/84* | (2017.01) | |
| *B65B 61/18* | (2006.01) | |
| *B65D 77/22* | (2006.01) | |

(52) U.S. Cl.
CPC ............ *B65G 27/16* (2013.01); *B31B 70/844* (2017.08); *B65B 61/186* (2013.01); *B65B 61/202* (2013.01); *B65D 77/225* (2013.01)

(58) Field of Classification Search
CPC ... B65B 61/186; B65B 61/202; B65D 77/225; B65G 27/16; B65G 65/44; B65G 51/02; Y10T 156/1734
USPC .................................................. 156/514, 552
See application file for complete search history.

(56) References Cited

U.S. PATENT DOCUMENTS

| 3,747,738 A | 7/1973 | Greck ...................... 198/33 AA |
| 3,948,711 A | 4/1976 | Piatek ........................... 156/215 |
| 4,533,425 A * | 8/1985 | Wehle ..................... B29C 65/08 |
| | | 156/466 |
| 4,690,667 A | 9/1987 | Domke ......................... 493/213 |

(Continued)

FOREIGN PATENT DOCUMENTS

| EP | 0588907 | 3/1994 |
| EP | 3055225 | 8/2016 |

(Continued)

OTHER PUBLICATIONS

English translation of Office Action dated Jun. 20, 2019 in corresponding Russian application 2018/132005/11, including Search Report, 7 pages.

(Continued)

*Primary Examiner* — Andrew M Tecco
*Assistant Examiner* — Nicholas E Igbokwe
(74) *Attorney, Agent, or Firm* — Fattibene and Fattibene LLC; Paul A. Fattibene

(57) ABSTRACT

A machine and method for the application of pressure relief valves for hermetic containers. The machine comprising an applicator configured to apply the valves to containers, a vibrating feed container for housing the valves and making the valves directly available to the applicator, an aspirator configured so as to suck the valves contained within a reservoir and convey them to the vibrating feed container through a tube. The method comprises supplying pressure relief valves to the vibrating feed container of the machine by sucking the valves from the reservoir.

6 Claims, 6 Drawing Sheets

(56) References Cited

U.S. PATENT DOCUMENTS

| | | | | |
|---|---|---|---|---|
| 4,845,927 A | * | 7/1989 | Rapparini | B65B 31/022 53/511 |
| 5,354,133 A | | 10/1994 | Rapparini | 383/103 |
| 5,467,581 A | * | 11/1995 | Everette | B65B 61/186 53/133.1 |
| 7,207,153 B1 | * | 4/2007 | Malin | B29C 66/133 53/410 |
| 2011/0211919 A1 | | 9/2011 | Rasner | 406/14 |
| 2015/0266596 A1 | * | 9/2015 | Beer | B65B 61/00 53/459 |
| 2016/0264332 A1 | * | 9/2016 | Rapparini | B65D 65/466 |
| 2019/0100380 A1 | * | 4/2019 | Helfenstein | B65G 27/26 |

FOREIGN PATENT DOCUMENTS

| | | | | |
|---|---|---|---|---|
| JP | H04256619 | | 9/1992 | |
| JP | H04256619 A | * | 9/1992 | B65G 47/14 |
| JP | 2002060061 | | 2/2002 | |
| JP | 2002060061 A | * | 2/2002 | B65G 47/14 |
| RU | 2058256 | | 4/1996 | |
| SU | 1225802 | | 4/1986 | |

OTHER PUBLICATIONS

English translation of Office Action in corresponding Korean application 10-2018-0111368, 4 pages.
Search Report and written opinion for corresponding Italian Application No. 201700107570, dated May 15, 2018; 7 pages.
"Foedern mit Vakuum", Chemietechnik, Huthig, Heidelberg, DE, vol. 21, No. 12, Dec. 1, 1992, p. 77.

* cited by examiner

MACHINE AND METHOD FOR PRESSURE RELIEF VALVES FOR HERMETIC CONTAINERS

FIELD OF THE INVENTION

The present invention refers to the technological field of pressure relief valves for hermetic containers. In particular, the present invention refers to a machine for the application of such valves and to a method used to supply such valves to the machine.

BACKGROUND OF THE INVENTION

Some types of pressure relief valves have been known on the market for many years. For example, such valves are described in patent documents EP 0 588 907 B1 and EP 3 055 225 B1, and an example of these is represented in FIG. 1.

Recently, the market of such valves has experienced a rapid growth that has made an annual production of billions of units necessary. The high market demand, currently still growing, requires the use of very fast production plants.

Concerning this, in the state of the art there are known machines 100 for the application of such valves on hermetic containers. As described in FIG. 2, such machines 100 comprise a vibrating container 101, such as a vibrating bowl, normally positioned at a height L1 with respect to the lower end of the machine 100 so that application means (not depicted in detail) can receive such valves 10 from the vibrating container 101 and apply them directly on the containers. Such a height L1 is normally comprised between 2 and 5 metres. Indeed, the vibrating container 101 makes it possible to orient the valves contained within through vibration and conveys them one by one inside a guide from which they will then be applied one by one on the film that will then become the end container.

The vibrating container 101 is normally positioned above, at a certain height with respect to the lower end of the machine 100 so as to facilitate the movement of the valves 10 by gravity. The vibrating container 101 normally has a volume that is around 2 or 3 litres.

Such machines 100 have the drawback that whenever the amount of valves 10 contained inside the vibrating container 101 is less than a predetermined amount (as shown in FIG. 3), an operator must climb up to the vibrating container 101 and fill it (as shown in FIG. 4). For example, as can be seen in the figure, the operator can go up to a reservoir 11 arranged on the ground, fill a bucket with the valves 10, go to the vibrating container 101 with the full bucket of valves 10 and pour the valves 10 inside the vibrating container 101.

In this way, however, there are three substantial drawbacks.

The first drawback concerns the fact that the plant cannot be automated since an operator must always be ready to intervene by filling the vibrating container 101.

The second drawback consists of having an amount of valves inside the vibrating container 101 that varies substantially, thus having highly variable operating conditions. Indeed, after the operator fills the vibrating container 101 it will be full of valves 10 that given their amount will thus exert a strong pressure on the valves 10 beneath. Therefore, immediately after the vibrating container 101 has been filled, the valves 10 will have substantial difficulty in orienting themselves since they are subject to the pressure of the valves 10 arranged above. The pressure of the valves 10 thus hinders the free vibration of the valves 10, thus creating blockages. Indeed, as can be seen in the detail of the vibrating container 101 of FIG. 4, it will be filled as much as possible so as to allow the operator to reduce the frequency with which the container 101 is filled.

The third drawback corresponds to the fact that, in pouring the valves 10 inside the vibrating container 101, it is also possible for some of the valves 10 to accidentally fall out from the vibrating container 101 and thus being lost.

Concerning this, the present invention aims to solve such technical problems by supplying a machine 100 for the application of pressure relief valves 10 for hermetic containers that is capable of being greatly automated and thus not needing an operator who must regularly fill the vibrating container 101 and that decreases the risk of glitches in the conveying of the valves.

SUMMARY OF THE INVENTION

The present invention is based on the idea of supplying the machine for the application of pressure relief valves of an aspirator capable of sucking the valves from a reservoir outside of the machine and depositing them inside the container of the machine where such valves are collected.

According to an embodiment of the present invention a machine for the application of pressure relief valves for hermetic containers is provided, in which the machine comprises: application means configured to apply the valves to containers; a vibrating feed container for housing the valves and making them directly available to the application means; characterised in that the machine further comprises an aspirator configured so as to suck the valves contained within a reservoir and convey them to the vibrating container preferably through a tube. This solution is particularly advantageous since it makes it possible to autonomously suck the valves contained within a reservoir through an aspirator. This thus implies the possibility of automatically filling the container and maintaining the level thereof constant without an operator having to manually insert the valves inside it. Indeed, given that for constructive reasons the container for housing the valves and making them directly available to the application means is positioned at a certain height with respect to the lower end of the machine so as to facilitate the movement of the valves by gravity, there would otherwise be the problem of having to manually fill the container positioned at a certain height. Moreover, the fact that it is possible to maintain the level of the valves within the container constant makes it possible to have stable operating conditions and also makes it possible to select the level of valves in the container that is deemed best to ensure the orientation and prevent glitches. In addition, also in the case in which the vibrating container and the reservoir are arranged on the same level, thanks to such an aspirator it is possible to proceed with the automatic filling of the vibrating container and also maintain the level of the valves substantially constant, thus in any case having two substantial advantages. In the present invention, the term "reservoir" is meant to indicate any container within which valves can be collected, like for example a collection tank or a bag or similar. Preferably, the reservoir is an external element to the machine and thus not forming part of the machine. Alternatively, the reservoir could be an element of the machine arranged upstream with respect to the vibrating container in the feeding direction of the valves to the machine. The possibility of supplying the valves through a tube makes it possible to place the reservoir and the vibrating container of the machine for the application of valves at any desired distance and to connect the reservoir and the vibrating container through a tube of suitable length.

According to an embodiment of the present invention a machine is provided in which the aspirator is positioned vertically above the container. This solution is particularly advantageous since it makes it possible to suck the valves directly from the reservoir and then convey them by gravity from the aspirator within the feeding container. Moreover, it is also advantageous since placing the aspirator directly above the feeding container makes it possible to effectively exploit the spaces of the machine limiting the space that it occupies.

According to an embodiment of the present invention a machine is provided in which the aspirator has a power of at least 1 kW. Thanks to this power it is possible, in most cases, to ensure the substantially constant level of the valves inside the vibrating container in the case for example of a container positioned 2-5 metres higher than the valves reservoir. Moreover, the aspirator can intervene preferably every 3-5 minutes so as to maintain the level of the valves substantially constant. Such a frequency in the intervention would be very difficult for an operator since he/she would have to intervene manually every 3-5 minutes to load the container. This solution is thus particularly advantageous since it effectively makes it possible in this way to adjust the flow rate of valves in the container.

According to an embodiment of the present invention a machine is provided in which the tube has a diameter of about 40 mm.

According to an embodiment of the present invention a machine for the application of pressure relief valves for hermetic containers is provided, in which the machine further comprises a sensor configured to detect the level of the valves contained inside the container, in which the aspirator is configured so as to be preferably activated and/or deactivated according to the signal coming from the sensor. This solution is particularly advantageous since it makes it possible to greatly automate the machine and therefore to decrease the need for the presence of an operator. Indeed, in this case, thanks to the sensor it is possible to detect the level of the valves inside the container and therefore the number of valves still present inside the container. Therefore, in the case in which the amount of valves detected is less than a predetermined value, the aspirator can be actuated automatically and a certain amount of valves contained inside the reservoir can be automatically conveyed inside the container. This solution is also very advantageous because it also implies the possibility of using a relatively smaller container with respect to the case without aspirator. This is because through such an aspirator it is no longer necessary for an operator to regularly fill the container and the filling process can be carried out more often, since as stated it is totally automatic, and therefore it is thus possible to have, for example, even a relatively smaller container.

According to an embodiment of the present invention a machine is provided in which the vibrating container has a volume comprised between 2 and 3 litres and is filled preferably for less than ⅘ of its volume, even more preferably for less than ⅗ of its volume, even more preferably for less than ½ of its volume, even more preferably for less than ⅔ of its volume, even more preferably for less than ⅕ of its volume. Such a container makes it possible to orient the valves contained within through a vibration, conveying them oriented and singularly for example inside a guide from which they will then be applied one by one on the film that will then become a bag or a container. Since it is a vibrating container, if the operator fills the vibrating container to maximum load a great load bears down on the valves below, which will thus have difficulty orienting themselves, creating jamming, which normally occurs when the operator fills the vibrating container. Therefore, maintaining the amount of valves within the vibrating container below a maximum value will decrease the pressure exerted on the valves below and thus will consequently decrease the probability of jams.

According to an embodiment of the present invention a machine is provided in which the height of the container with respect to the lower end of the machine is comprised between 2 and 5 m. Such a suction height can be ensured for example by an aspirator of the power of at least 1 kW.

According to an embodiment of the present invention a machine is provided in which the reservoir is positioned at a height with respect to the lower end of the machine that is less than the height of the container with respect to the lower end of the machine, more preferably the reservoir is positioned at a height with respect to the lower end of the machine equal to zero. This solution is particularly advantageous since it makes it possible to position the reservoir on the ground in the room and fill it extremely easily. Indeed, even if the container is positioned very high up, the filling thereof is ensured by the aspirator.

According to an embodiment of the present invention a machine is provided in which the aspirator is configured to maintain the level of the valves within the container substantially constant. This solution is particularly advantageous since, as stated, having the level of the valves substantially constant makes it possible to have stable operating conditions.

According to an embodiment of the present invention a method for supplying pressure relief valves for hermetic containers to application means of a machine for the application of valves is provided, comprising a suction phase of valves so as to be sucked from a reservoir and so as to convey them inside a vibrating feed container of the machine. This solution is particularly advantageous since it makes it possible to autonomously suck the valves contained within a reservoir through the aspirator. This thus implies the possibility of filling the feeding container automatically without an operator having to manually insert the valves inside it. Indeed, given that for constructive reasons the container for housing the valves and making them directly available to the application means is normally positioned at a certain height with respect to the lower end of the machine, and thus to the floor of the room, there would otherwise be the problem of having to manually fill the container positioned at a certain height. Moreover, such suction can be carried out through a simple aspirator also substantially limiting the manufacturing costs of such a system. Such application means preferably pick up the valves from the container and apply them to the containers.

According to an embodiment of the present invention a method for supplying pressure relief valves is provided, in which the suction flow rate of the valves is maintained to be substantially equal to the flow rate of the valves supplied to the application means, so as to have a substantially constant amount of valves inside the vibrating container. Moreover, preferably such a suction flow rate is kept as constant as possible so as to avoid oscillations. This solution is particularly advantageous since it makes it possible to maintain the level of the valves within the vibrating container constant. Such a flow rate of entering valves is supplied by the aspirator that by sucking air pulls the valves into the vibrating container. This thus ensures that there are substantially stable operating conditions and also makes it possible to select the level of valves in the container that is deemed best to ensure the orientation and prevent glitches. Moreover, this solution is advantageous since it makes it possible to have an aspirator of relatively low power that ensures that relatively low flow rates are reached. Moreover, thanks to the fact that the flow rates going out of and into the vibrating container have the same value makes it substantially possible to have a constant value of valves contained inside the vibrating container.

According to an embodiment of the present invention a method for supplying pressure relief valves is provided in which the value of the suction flow rate is configured to be discontinuous between a zero flow rate value and a predetermined value, in which the time duration of the zero flow rate is a function of the productivity of the machine, preferably for example comprised between 3 and 5 minutes. The term productivity of the machine is meant to indicate the number of valves used by the machine: the higher the productivity the quicker the machine will consume a certain number of valves. This solution is particularly advantageous since it makes it possible to have an aspirator that even only through intermittent operation (thus operating for example every 3-5 minutes) makes it possible to ensure a substantially constant level of the valves indeed thanks to the operation every 3-5 minutes, with an average productivity of the machine, the level of the valves will not change much. However, in the case in which the productivity is increased or decreased, the time interval will decrease and increase respectively. In this particular case of discontinuous suction flow rate value, the flow rate of valves supplied to the container through the aspirator will preferably be greater than the flow rate of valves supplied to the application system so that, by alternating pause periods with operating periods of the aspirator, there is a substantially constant amount of valves inside the vibrating container.

According to an embodiment of the present invention a method for supplying pressure relief valves is provided, in which the level of the valves inside the vibrating container is maintained less than or equal to $4/5$ of the height of the vibrating container, more preferably less than or equal to $3/5$ of the height of the vibrating container, even more preferably less than or equal to $1/2$ of the height of the vibrating container, even more preferably less than or equal to $2/5$ of the height of the vibrating container, even more preferably less than or equal to $1/5$ of the height of the vibrating container. This solution is particularly advantageous since, by combining it with a suction of the valves, it makes it possible to have a substantially constant and optimal level of valves inside the vibrating container. Therefore, maintaining the amount of valves inside the vibrating container below a maximum value will decrease the pressure exerted on the valves below and thus will consequently decrease the probability of jamming.

According to an embodiment of the present invention a method for supplying pressure relief valves is provided, in which the suction phase is combined with a vibration phase, in which the vibrating container is made to vibrate so as to allow the conveying of the valves having a predetermined orientation towards the application means. This solution is particularly advantageous since it makes it possible to combine the vibration process of the container with the filling process. Indeed, for example, after the container has accumulated a predetermined number of valves having a certain orientation in a guide that conveys the valves to application means, the vibrating container can enter into stop phase and at that point the aspirator can be turned on to bring the level of valves within the container to the predetermined value. The term combination is indeed meant to indicate that the user of the machine can freely decide how to regulate the two phases (suction and vibration) that are independent from one another and can for example also be carried out simultaneously.

According to an embodiment of the present invention a method for supplying pressure relief valves is provided in which the vibrating container is positioned higher than the reservoir. This solution is advantageous because it makes it possible for example to suck valves positioned on the ground and convey them directly to the vibrating container positioned preferably in an upper position of the machine so as to exploit gravity to move the valves inside the machine.

BRIEF DESCRIPTION OF THE FIGURES

The present invention will be described with reference to the attached figures in which the same reference numerals and/or signs indicate the same part and/or similar and/or corresponding parts of the system. In the figures.

DETAILED DESCRIPTION OF THE INVENTION

Hereinafter, the present invention is described with reference to particular embodiments as illustrated in the attached figures. However, the present invention is not limited to the particular embodiments described in the following detailed description and represented in the figures, but rather the embodiments described simply exemplify the various aspects of the present invention, the scope of which is defined by the claims. Further modifications and variations of the present invention will become clear to those skilled in the art.

Figure 1:
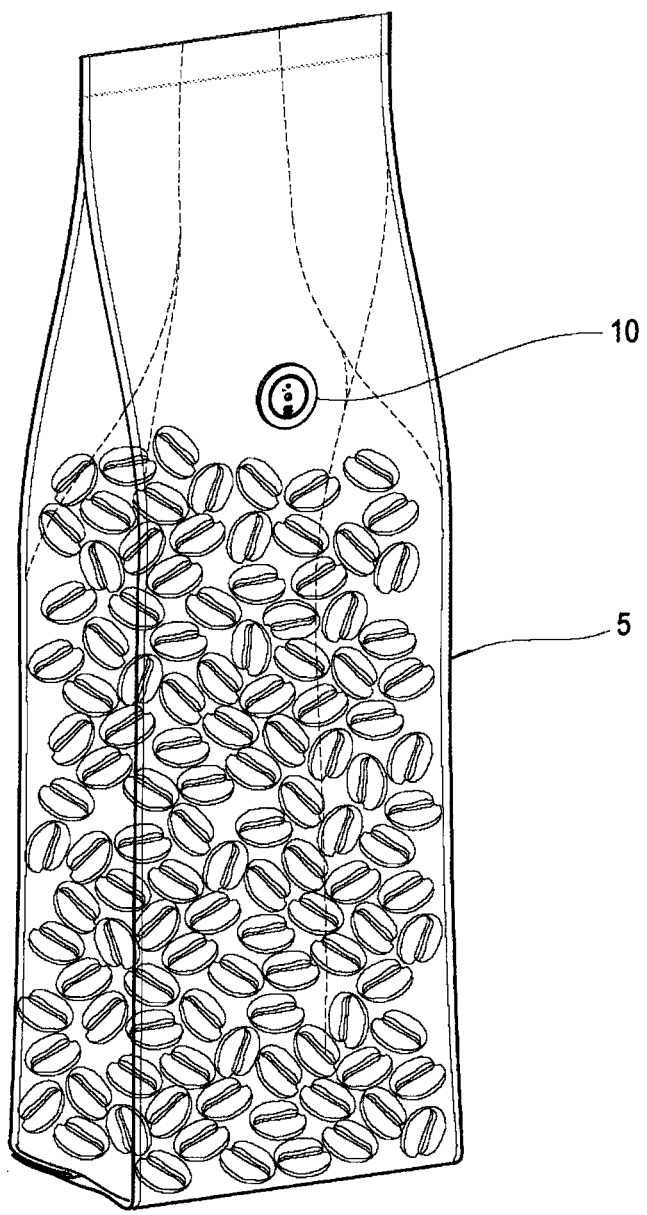
FIG. 1 schematically illustrates a three-dimensional view of a pressure relief valve applied onto a container.

FIG. 1 shows an example of a pressure relief valve 10 applied on a hermetic container 5. The valve 10 represented in the figures is a one-way pressure relief valve for hermetic containers, which comprises a valve body, a valve cover and a valve membrane. The valve body comprises a base comprising a sealing seat for the valve membrane and one or more holes adapted for allowing gas to pass through the valve. The valve cover is housed in the valve body and comprises a pressure relief opening and the valve membrane is arranged between the valve body and the valve cover in the sealing seat. Such valves can for example have a diameter of 20 mm and a thickness of about 2 mm. However, it is clear that this is a simple example and that the present invention can be used for pressure relief valves 10 of various shapes and sizes. Examples of such valves can be found in EP 0 588 907 B1 and EP 3 055 225 B1

Figure 2:
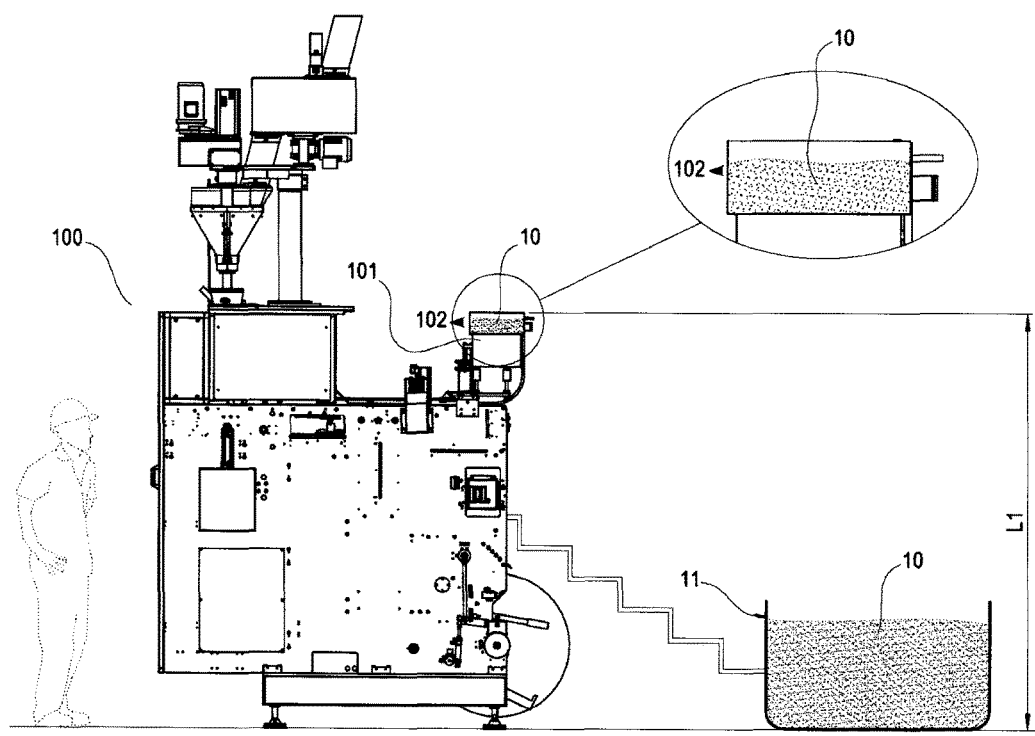
FIG. 2 schematically illustrates a machine for the application of pressure relief valves known in the state of the art in a full container state.
Figure 3:
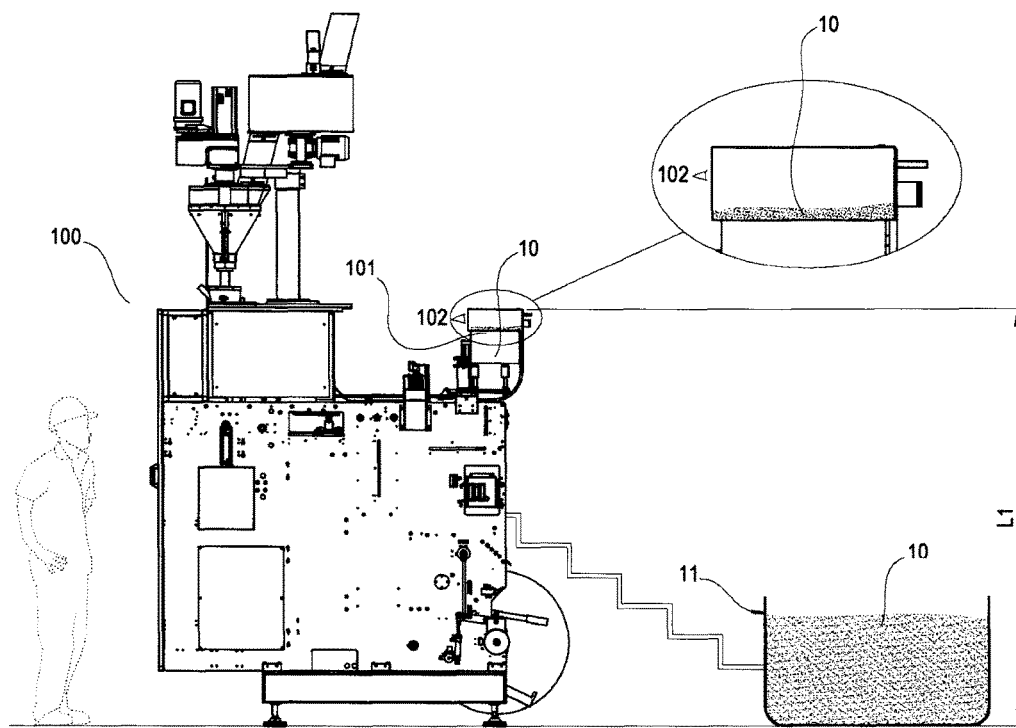
FIG. 3 schematically illustrates a machine for the application of pressure relief valves known in the state of the art in a substantially empty container state.
Figure 4:
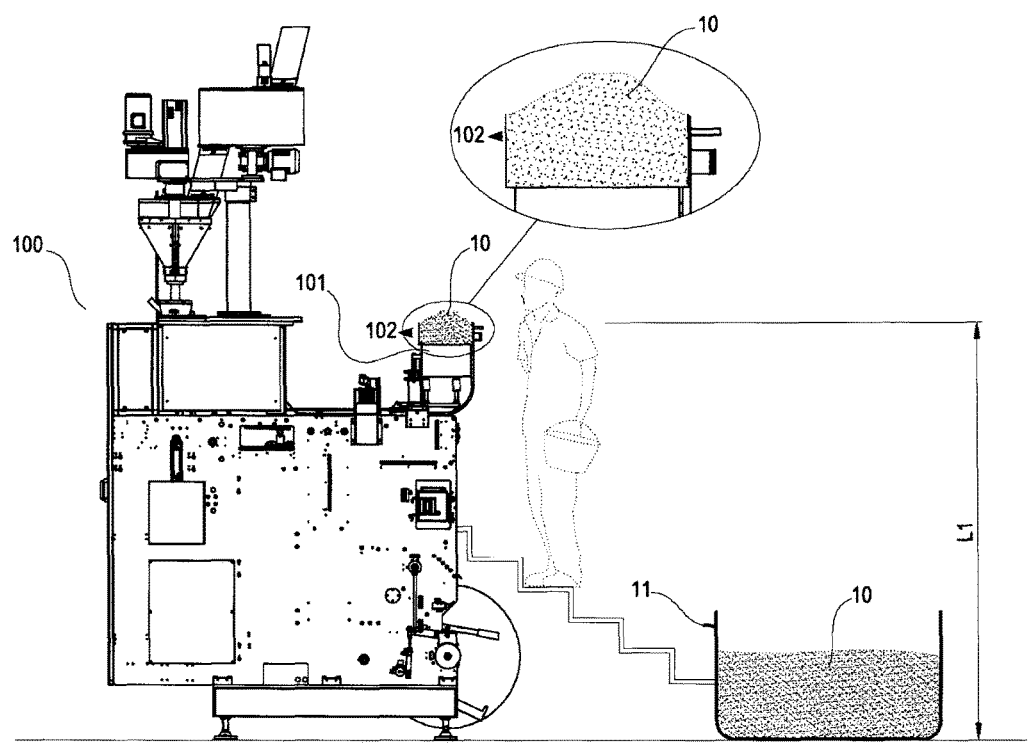
FIG. 4 schematically illustrates a machine for the application of pressure relief valves known in the state of the art in a state after the container has been filled by an operator.

As described for the relative state of the art, and as depicted in FIGS. 2 to 4, in the state of the art there are known machines 100 for the application of pressure relief valves 10 for hermetic containers that comprise a vibrating container 101 positioned at a height L1 with respect to the lower end of the machine 100 so that application means (not depicted in detail) receive such valves 10 coming from the vibrating container 101 to apply them directly on the containers. Such a vibrating container 101 normally has a volume comprised between 2 and 3 litres. However, as already described earlier such machines have substantial drawbacks.

Figure 5:
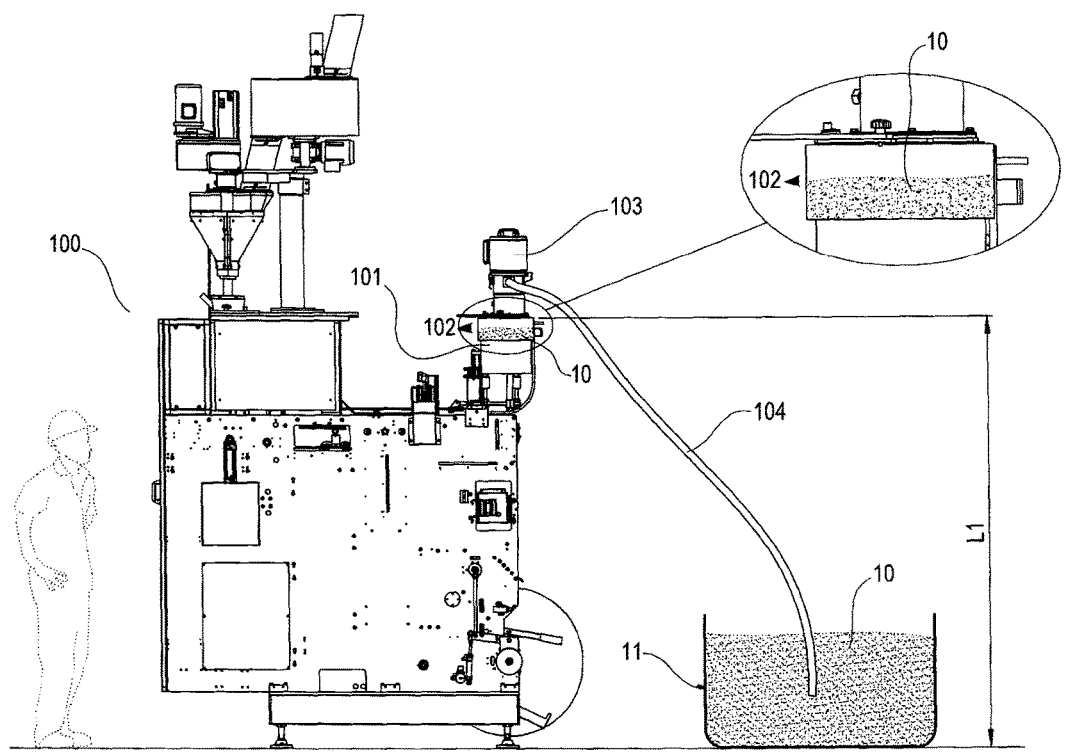
FIG. 5 schematically illustrates a machine for the application of pressure relief valves according to an embodiment of the present invention.

FIG. 5 shows a machine 100 according to an embodiment of the present invention. In such a machine 100, an aspirator 103 is installed vertically above the vibrating container 101 and is configured so as to suck air through a tube 104. Such an aspirator 103 can have a power of at least 1 kW in the case in which for example the valves 10 must be sucked from a reservoir 11 positioned between 2 and 5 metres below. Therefore, in the case in which such a height decreases or increases it will be advisable to change the maximum power of the aspirator 103.

A tube 104 connects the aspirator 103 to a reservoir 11 inside which, as stated, a large amount of valves 10 is arranged. In this way the aspirator 103, through the tube 104, and through the regulation of the suction flow rate of the aspirator 103, is capable of transporting a predetermined amount of valves 10 that are pulled by the sucked air.

The flow rate of the aspirator 103 can for example be controlled by an operator on a control panel not represented in the figures or even be regulated automatically by detecting the amount of valves 10 contained inside the vibrating container 101. The tube 104 can for example have a diameter of about 40 mm. However, it is clear that such a diameter depends greatly for example on the type of aspirator used and on the type of valves 10.

In the present description, the term reservoir 11 is meant to indicate any element capable of containing a multitude of valves 10. For example, the reservoir can be represented by a tank, a barrel, a bag, etc. inside which the valves 10 are contained. The reservoir, as shown in the figures, is positioned on the ground. However, it is clear that such a reservoir can also be positioned under the ground or even above ground and it can also be positioned in another room. Indeed, thanks to the tube 104 that is whatever length is desired and connects the reservoir 11 to the vibrating container 101 it is thus possible, by operating the aspirator 103, to place the two elements any desired distance apart. For example the reservoir 11 can even be positioned in the cellar.

The amount of valves 10 in the vibrating container 101 can be monitored through a sensor 102. Such a sensor 102 can be configured so as to detect the amount of valves 10 contained inside the vibrating container 101 and to send a signal to the aspirator 103, directly or through a control unit, for example so as to activate the aspirator 103 and suck a certain amount of valves 10 when the amount of valves 10 inside the vibrating container 101 detected by the sensor 102 is below a certain threshold.

Such a sensor 102 can for example be a photocell configured so as to recognise the level of the valves 10 contained inside the vibrating container 101. Alternatively a capacitive sensor capable of measuring the amount of valves 10 contained in the vibrating container 101 can also be used.

As stated earlier, the vibrating container 101 is configured so as to supply the valves 10 to the application means through vibration of the vibrating container 101, in which such a vibration is caused for example by vibration means positioned below the container 101. Such valves 10 are thus supplied oriented to the application means so as to then be applied one by one on a film that will then become the final package.

Therefore, after a certain amount of valves 10 has been used, the level of valves 10 inside the vibrating container 101 tends to decrease. As stated, the sensor 102 is capable of detecting the amount of valves 10 contained inside the vibrating container 101 and of communicating it to the control unit of the machine 100.

Figure 6:
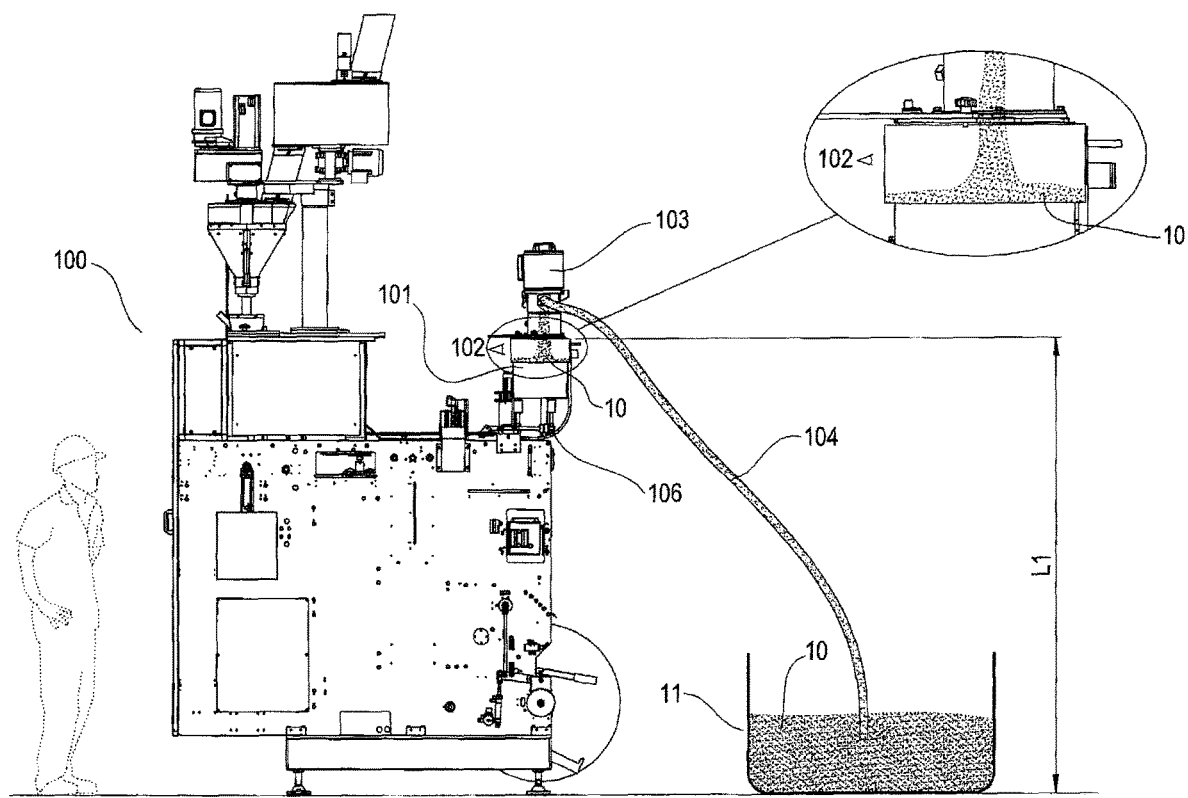
FIG. 6 schematically illustrates a machine for the application of pressure relief valves according to an embodiment of the present invention in the phase in which the valves are sucked from a reservoir.

During the filling process, as shown in FIG. 6, by sucking air directly from the reservoir 11 through the tube 104, the aspirator 103 conveys the valves 10, pulled by the sucked air, from the reservoir 11 through the tube 104 until they then reach the vibrating container 101 for example by gravity.

According to an embodiment of the present invention, the aspirator 103 is configured to maintain the level of the valves 10 within the vibrating container 101 substantially constant. This implies that the aspirator 103 will be configured so as to operate continuously so as to suck from the reservoir 11 the same flow rate of valves exiting the vibrating container 101. In this way it will thus be possible to maintain the level of the valves 10 within the vibrating container 101 substantially constant.

As shown in FIG. 5, such a level will preferably be equal for example to a lower height with respect to half of the height of the vibrating container 101. In this way it will thus be possible to prevent excessive loading of the valves 10 positioned on the bottom of the vibrating container 101 and consequently allow them to orientate themselves without creating clogging.

However, according to another alternative embodiment of the present invention, the aspirator 103 can also be configured so as to be turned on intermittently at intervals for example comprised between 3 and 5 minutes according to the flow rate of valves 10 exiting the vibrating container 101. However, it is clear that such intervals are only an example, in the case in which for example the productivity of the machine is increased, such an interval can consequently decrease since the machine will have a greater consumption of valves 10. Indeed, in many cases, a slight variation of the amount of valves 10 contained inside the vibrating container 101 is more than acceptable. Moreover, it should be noted that in any case this last solution is much more advantageous with respect to manual filling of the vibrating container 101 since it would be much too arduous for an operator to proceed for example every 3 minutes with filling the vibrating container 101. In addition, according to this particular embodiment it is thus possible to vary between a zero flow rate value and a predetermined flow rate value, for example equal to the ideal flow rate conditions of the aspirator 103.

The system can also be configured so that the aspirator is deactivated when the amount of valves 10 inside the vibrating container 101 detected by the sensor 102 has reached and/or exceeded a certain threshold. For example, as shown in FIG. 6, after the detection sensor 102 detects that the level of valves 10 contained inside the container 101 has fallen to a predetermined value, a turn on signal is sent to the aspirator and the vibrating container 101 is filled up to a predetermined value.

Indeed, after the detection sensor 102 detects that the amount of valves 10 has reached a predetermined value, the machine 100 is capable of sending a signal to the aspirator 103 blocking it and stopping the filling process of the container 101 to start again when the sensor 102 signals for example that a predetermined level has been reached, for example equal to 1/10 of the height of the vibrating container 101.

Moreover, it is clear from the description that the filling process of the vibrating container 101 and therefore the suction of the valves 10 can be carried out simultaneously with the process of supplying the valves to the application means or mechanism 106 through vibration of the vibrating container 101 thus allowing the vibrating container 101 to be filled without having to interrupt the vibration of the vibrating container 101. For example, in the case of a machine set up so as to have high productivity, the container 101 can also be made to vibrate while the container 101 is filled through the aspirator. However, it is clear that in many cases, given that the vibrating container 101 is configured so as to have stopped moments and on the other hand moments in which through the vibration it conveys the valves 10 to the application means through a guide, it may be that the two operations (vibration and filling) are not carried out simultaneously.

It is also clear that the suction process through the aspirator 103 can be carried out analogously to that of the state of the art, i.e. that the filling process is carried out only after the sensor 102 detects that the amount of valves 10 is below a minimum level and proceeds with the filling of the vibrating container 101 up to the rim. This solution in any case has the substantial advantage, with respect to the state of the art, of not having to proceed manually with the filling of the vibrating container 101.

Even if the present invention has been described with reference to the embodiments described above, it is clear to those skilled in the art that it is possible to make different modifications, variations and improvements of the present invention in light of the teaching described above and in the attached claims without departing from the object and the scope of protection of the invention.

Indeed, it is clear that even if in the figures it has been depicted that the aspirator 103 is positioned vertically above and directly in contact with the vibrating container 101, it is possible to position such an aspirator 103 at an even higher level with respect to that drawn in the figures or it is even possible to position it laterally to what is depicted, or even lower than what is depicted.

Even if in the figures the reservoir 11 is positioned on the same level as the machine 100, i.e. at the ground level, it is also possible to position such a reservoir below or above what is drawn. Indeed, if for example such a reservoir is positioned in another room and/or at a lower level than the machine, the aspirator 103 is capable in any case of sucking the valves 10 from such a reservoir. Moreover, even if a single reservoir has been drawn it is possible to connect the aspirator 103 to multiple reservoirs.

Finally, anything that is deemed known by those skilled in the art has not been described in order to avoid needlessly excessively obfuscating the described invention.

Consequently, the invention is not limited to the embodiments described above, but is only limited by the scope of protection of the attached claims.

What is claimed is:

1. A machine for the application of pressure relief valves for hermetic containers, said machine comprising:
    application means which are configured to apply said valves to containers;
    a vibrating feed container for housing said valves, for orienting them through vibration and making them directly available to said application means;
    wherein said machine further comprising an aspirator configured so as to suck said valves, which are contained within a reservoir, and to convey them to said vibrating feed container through a tube.

2. The machine according to claim 1, wherein said aspirator is positioned vertically above said vibrating container.

3. The machine according to claim 1, wherein said machine further comprises:
    a sensor configured to detect the level of said valves, contained within said vibrating container, wherein said aspirator is configured to be activated and/or deactivated according to a signal coming from said sensor.

4. The machine according to claim 1, wherein:
    said aspirator is configured to maintain the level of said valves within said vibrating container substantially constant.

5. The machine according to claim 1, wherein:
    said reservoir is positioned at a lower position with respect to said vibrating container.

6. A machine for the application of pressure relief valves to hermetic containers, said machine comprising:
    a pressure relief valve applicator mechanism, whereby the pressure relief valves are attached to the hermetic containers;
    a vibrating feed container attached to said pressure relief valve applicator mechanism, said vibrating feed container is configured to orient the pressure relieve valves through vibration and to make them available to said pressure relief valve applicator mechanism;
    a pressure relief valve reservoir;
    a tube connecting said pressure relief valve reservoir to said vibrating feed container; and
    an aspirator coupled to said tube, whereby the pressure relief valves are supplied to said vibrating feed container from said pressure relief valve reservoir,
    whereby said vibrating feed container is capable of being filled with the pressure relief valves from said pressure relief valve reservoir through said tube.

* * * * *